United States Patent
Szucs

(10) Patent No.: US 8,527,753 B2
(45) Date of Patent: Sep. 3, 2013

(54) METHOD AND DEVICE FOR DETERMINING A UNIQUE CONTENT INSTANCE IDENTIFIER, UNIQUE CONTENT INSTANCE IDENTIFIER AND METHOD AND DEVICE FOR MANAGING CONTENT LICENSES

(75) Inventor: Paul Szucs, Esslingen-Berkheim (DE)

(73) Assignee: SONY Deutschland GmbH, Berlin (DE)

( * ) Notice: Subject to any disclaimer, the term of this patent is extended or adjusted under 35 U.S.C. 154(b) by 848 days.

(21) Appl. No.: 12/522,441

(22) PCT Filed: Jan. 9, 2008

(86) PCT No.: PCT/EP2008/000115
§ 371 (c)(1),
(2), (4) Date: Jul. 8, 2009

(87) PCT Pub. No.: WO2008/083959
PCT Pub. Date: Jul. 17, 2008

(65) Prior Publication Data
US 2010/0058069 A1    Mar. 4, 2010

(30) Foreign Application Priority Data
Jan. 10, 2007 (EP) .................................... 07000461

(51) Int. Cl.
*H04L 9/12* (2006.01)
*G06F 7/06* (2006.01)

(52) U.S. Cl.
USPC .......................................... 713/167; 713/165

(58) Field of Classification Search
None
See application file for complete search history.

(56) References Cited

U.S. PATENT DOCUMENTS

| | | | |
|---|---|---|---|
| 5,982,891 A | 11/1999 | Ginter et al. | |
| 7,299,362 B2* | 11/2007 | Shen et al. ..................... | 713/189 |
| 2003/0229900 A1 | 12/2003 | Reisman | |
| 2004/0031058 A1 | 2/2004 | Reisman | |
| 2006/0114785 A1* | 6/2006 | Ohgose et al. ............... | 369/53.2 |
| 2006/0171474 A1 | 8/2006 | Ramaswamy et al. | |
| 2007/0027957 A1 | 2/2007 | Peters et al. | |
| 2007/0038857 A1* | 2/2007 | Gosnell ......................... | 713/165 |

(Continued)

FOREIGN PATENT DOCUMENTS

| | | |
|---|---|---|
| WO | 2004 098173 | 11/2004 |
| WO | 2006 012629 | 2/2006 |
| WO | 2006 014495 | 2/2006 |

OTHER PUBLICATIONS

DVB Presentation Content Protection and Copy Management Hilbert. Jan. 11, 2005.*

(Continued)

*Primary Examiner* — Venkat Perungavoor
(74) *Attorney, Agent, or Firm* — Oblon, Spivak, McClelland, Maier & Neustadt, L.L.P.

(57) ABSTRACT

The present disclosure is directed to determining a unique content instance identifier (CIID) for each content item handled in a content management system. The content item has been received from one of a plurality of content providers and/or content delivery channels and has been identified by said one of a plurality of content providers with an original content identifier within an original identification scheme. A data structure of the CIID is defined depending on the original identification scheme, the data structure including a first, a second and third part, wherein the size of at least one of the second and third parts depends on the original identification scheme; stores a code in the first part.

23 Claims, 11 Drawing Sheets

(56) References Cited

U.S. PATENT DOCUMENTS

| | | | |
|---|---|---|---|
| 2007/0050397 A1* | 3/2007 | Hokimoto | 707/102 |
| 2007/0204350 A1* | 8/2007 | Juszkiewicz | 726/30 |
| 2007/0277039 A1* | 11/2007 | Zhao | 713/176 |
| 2009/0319672 A1 | 12/2009 | Reisman | |
| 2009/0320073 A1 | 12/2009 | Reisman | |
| 2010/0218258 A1* | 8/2010 | Hwang et al. | 726/26 |

OTHER PUBLICATIONS

A Digital Televison Navigator. Peng et al. May 2002. Kluwer Academic Publishers.*

Storage Scheme of System Information for Digital Television Receiver. Sun et al. Jan. 13, 2003. IEEE.*

"Digital Video Broadcasting (DVB); Content Protection & Copy Management." DVB Document A094, SB 1496-1498. Nov. 2005, 103 pages.

Extended Search Report issued Jun. 1, 2011 in European Patent Application No. 11000282.1-2212/2333688.

DVD CPCM: DVB CPCM-Authorised Domain Management Protocol for DVB Content Protection and Copy Management (CPCM), p. 51, XP007901173, (2006).

Chinese Office Action issued Aug. 12, 2011, in Patent Application No. 200880002115.7 (English-language translation only).

European Office Action dated Oct. 26, 2010 in corresponding European Application No. 07 000 461.9.

Chinese Office Action issued Jan. 26, 2011, in Patent Application No. 200880002115.7 (submitting English Translation only).

Extended European Search Report issued May 31, 2011, in Patent Application No. 11000281.3.

Office Action issued Feb. 13, 2012, in European Patent Application No. 11 000 281.3.

Office Action issued Feb. 13, 2012, in European Patent Application No. 07 000 461.9.

Office Action issued Feb. 13, 2012, in European Patent Application No. 11 000 282.1.

Chinese Office Action issued Jul. 4, 2012 in Patent Application No. 200880002115.7 with English Translation.

* cited by examiner

| Scheme Code | Scheme | Pre-Allocated Part Length (Byte) | Freely Allocatable Part Length (Byte) |
|---|---|---|---|
| 0x00 | Reserved | Not applicable | Not applicable |
| 0x01 | DVB Broadcast Event and Acquisition Device | 14 | 1 |
| 0x02 | DVB Broadcast Service and Acquisition Device | 12 | 3 |
| 0x03 | CA System and Acquisition Device | 10 | 5 |
| 0x04 | DVB-MHP Application Identifier and Acquisition Device | 8 | 7 |
| 0x05 | Acquisition Device (only) | 8 | 7 |
| 0x06 | ISAN | 12 | 3 |
| 0x07 | Truncated ISAN | 8 | 7 |
| 0x08-0xFF | Reserved for future use | Not applicable | Not applicable |

FIG 3

METHOD AND DEVICE FOR DETERMINING A UNIQUE CONTENT INSTANCE IDENTIFIER, UNIQUE CONTENT INSTANCE IDENTIFIER AND METHOD AND DEVICE FOR MANAGING CONTENT LICENSES

TECHNICAL FIELD

The invention relates to a method for determining a unique content instance identifier of a content item, wherein said content item has been received by a receiving device and provided to a content management system, to a corresponding device for determining a unique content identifier, to a unique content identifier and to a method and a device for managing content licenses.

BACKGROUND OF THE INVENTION

When audiovisual content items are to be protected by means of encryption, it is common practice to maintain a data entity, referred to as content license (at least logically) separately from the content item itself. The content license contains protection related metadata for the content item such as usage rules settings and the content decryption key.

When defining a common system for the protection and management of audiovisual content in the consumer environment it is necessary to identify each content item that is acquired into that system uniquely. This is necessary in order to be able to reliably associate a content license with the associated content item of audiovisual content within said system. Due to the expected large number of devices able to acquire content into such system it appears to be excessively burdensome to devise a new system for content identification that is specific for that system.

Content acquired from many different sources or content providers, e.g. broadcast, DRM or packaged media enters a common system for its protection and management. Each of these content delivery channels could apply a different identification scheme of identifying individual content items.

So there is a need for a uniform method to associate every content license in the system to the associated content item uniquely, by whatever channel, and hence with whatever original content identification scheme and original content identifier the original content was delivered.

Content protection and management systems might operate within one of many home network ecosystems, therefore it needs its own independent method to identify individual items of content.

Such a common content management and protection system is, for example, the proposed DVB-CPCM (Digital Video Broadcast-Content Protection and Copy Management System). The Reference Model of the DVB-CPCM System is disclosed in DVB Blue Book A094, published November 2005. It describes a generic content license, but does not disclose the methods for managing content within the DVB-CPCM System. In particular, the data entities "Content Instance Identifier" as content item identifier and "Content License Creator" are disclosed, but their mode of function and exact meaning are not disclosed.

It is an object of the present invention to provide a method for determining a unique content instance identifier for each content item handled in a content management system, wherein said content item has been received from one of a plurality of content providers and/or content delivery channels and has been identified by said one of a plurality of content providers with an original content identifier within an original identification scheme.

The wording "content management system" is used throughout this description in embodiments in which the system is dealing mainly with managing content items without specifying whether a protection scheme is implemented or not, whereas the wording "content management and protection system" is used with respect to embodiments, in which the protection features are emphasized, e.g. with content licenses. However, in a "content management system" as used within this description also protection schemes might be implemented.

It is a further object of the invention to provide a device for determining a unique content instance identifier for each content item handled in a content management and protection system, wherein said content item has been received from one of a plurality of content providers and/or content delivery channels and has been identified by said one of a plurality of content providers with an original content identifier within an original identification scheme.

A still further object of the invention is to provide a unique content instance identifier format for each content item handled in a content management and protection system, wherein said content item has been received from one of a plurality of content providers and/or content delivery channels and has been identified by said one of a plurality of content providers with an original content identifier within an original identification scheme.

A further object of the invention is to provide a method and a device for managing content licenses in a content management and protection system in the consumer environment, wherein content items are handled.

SUMMARY OF THE INVENTION

The object is achieved in a first aspect by a method for determining a unique content instance identifier (CIID) of a content item, wherein said content item has been received by a receiving device and provided to a content management system and comprises an original content identifier of an original identification scheme, said method comprising:
  defining a data structure of said unique content item identifier depending on said original identification scheme, said data structure comprising a first, a second and third part, wherein the size of at least one of said second and third parts depends on the original identification scheme;
  storing a code in said first part, wherein said code uniquely identifies said original identification scheme;
  storing said original content identifier, a derivative thereof, and/or a device identifier identifying said receiving device in said second part;
  storing a freely allocatable value in said third part, such that no duplicate unique content instance identifiers are generated by said device.

With a second aspect a device for determining a unique content instance identifier of a content item is provided, wherein said content item has been received by a receiving device and provided to a content management system and comprises an original content identifier of an original identification scheme, comprising a system controller adapted to:
  apply a data structure of said unique content item identifier depending on said original identification scheme, said data structure comprising a first, a second and third part, wherein the size of at least one of said second and third parts depends on the original identification scheme;
  store a code in said first part, wherein said code uniquely identifies said original identification scheme;

store said original content identifier, a derivative thereof, and/or a device identifier identifying said receiving device in said second part;

store a freely allocatable value in said third part, such that no duplicate unique content instance identifiers are generated by said device.

With a third aspect a unique content instance identifier of a content item is provided, wherein said content item has been received by a receiving device and provided to a content management system and comprises an original content identifier of an original identification scheme, comprising:

a data structure depending on said original identification scheme, said data structure comprising a first, a second and third part, wherein the size of at least one of said second and third parts depends on the original identification scheme;

said first part comprising a code, wherein said code uniquely identifies said original identification scheme;

said second part comprising said original content identifier, a derivative thereof, and/or a device identifier identifying said receiving device in said second part;

said third part comprising a freely allocatable value, such that no duplicate unique content instance identifiers exist.

With a fourth aspect a method for managing content licenses in a content management and protection system is provided, wherein content items are handled, comprising: creating by a device, comprised within said system, a content license for a content item to manage the usage of said content item within said system, storing a device identifier of the device which has created the first content license for said content item as a Content License Creator (CLC) field in the content license (CL), such that this value is not changed by any compliant device within said content management and protections system (e.g. DVB-CPCM).

With a fifth aspect a device for managing content licenses in a content management and protection system is provided, wherein content items are handled, comprising: a system controller being adapted to create a content license for a content item to manage the usage of said content item within said system, and to store a device identifier of said device, which has created the first content license for said content item as a Content License Creator (CLC) field in the content license (CL), such that this value is not changed by any compliant device within said content management and protections system (e.g. DVB-CPCM).

BRIEF DESCRIPTION OF DRAWINGS

The above and other objects, features and advantages of the present invention will become more apparent from the following description of the presently preferred exemplary embodiments of the invention taken in conjunction with the accompanying drawings, in which FIG. 3 shows a table with examples of content instance identifier scheme codes.

DETAILED DESCRIPTION

Figure 1:
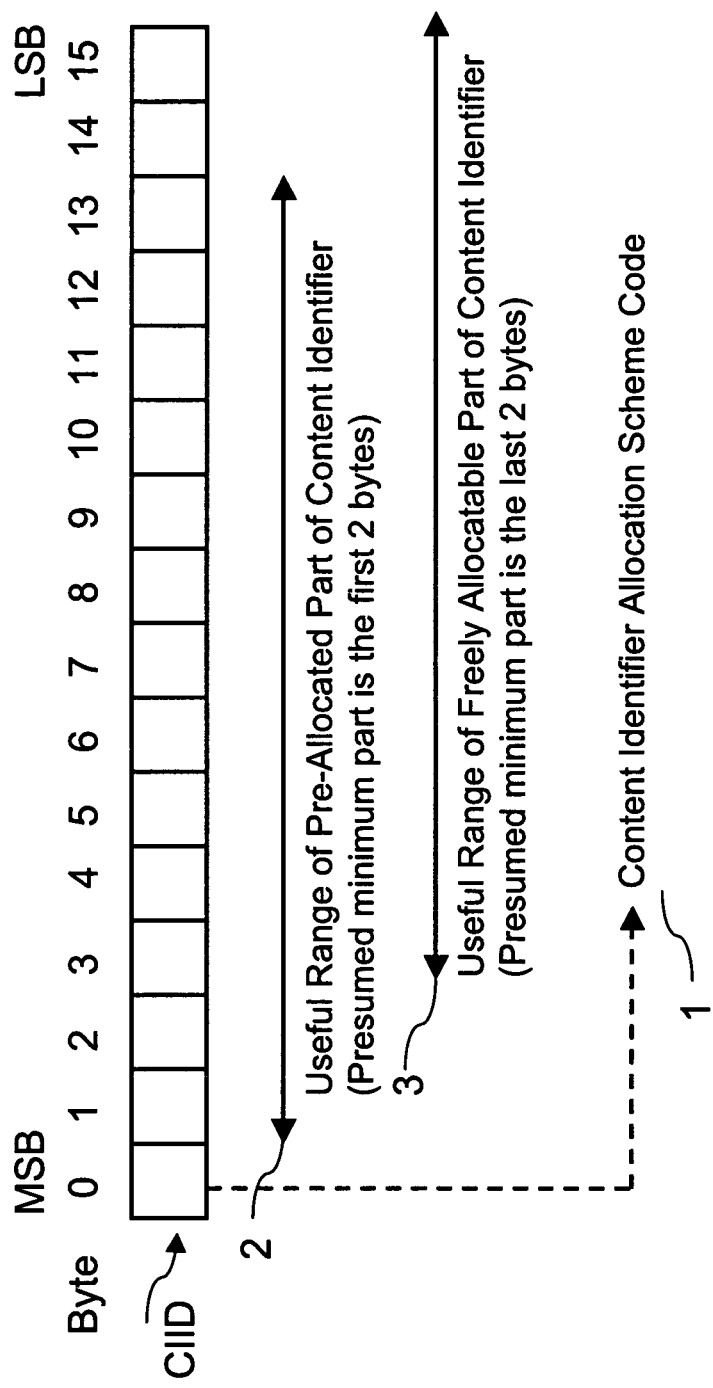
FIG. 1 shows a generic structure of a content instance identifier in a Common Protection and Management System.

A consumer environment contains many different kinds of devices that allow the user to enjoy content in different situations, for example stationary devices in the home, the same at any secondary residence, mobile devices in the car, or handheld portable devices. Content can be delivered to the consumer by various means, for example, via broadcast (cable, satellite or terrestrial), the Internet, from packaged media, mobile/cellular network, or managed broadband services.

Content is generally audio-visual content plus optional accompanying data, such as subtitles, images/graphics, animations, web pages, text, games, software (both source code and object code), scripts or any other information which is intended to be delivered to and consumed by a user. A content item is a discrete instance of content of finite duration. In a content protection and content management and protection system (e.g. DVB-CPCM) each content item is accompanied by a content license carrying associated usage information together with further metadata.

In order to manage the content licenses with respect to their associated content items a unique content instance identifier (CIID) is derived.

The allocation of the content instance identifiers (CIID) in the Common Management and Protection System (e.g. DVB-CPCM) works as follows:

1. Allow a large enough number space to comfortably accommodate all individual content items to be registered in the system, e.g. 128 bits (16 bytes).

2. Structure and code the content instance identifier (CIID) to accommodate the import of content applying various defined identification schemes, without requiring a unique registration scheme within the common system, apart from a simple short prefix code.

3. The external, original identification system of the content provider ensures uniqueness of a content item within that original system. This uniqueness is maintained within the common management and protection system by the application of prefix codes for each known external, original system, optionally some local constant value, for example a unique identifier of a device receiving that content, and the re-use of the original system's content identifier within the common system.

4. In the case that the uniqueness of the individually acquired content item is necessary, some identifier from the common system can be applied as a prefix to the external system content identifier, e.g. the unique device or device certificate identifier in the common system.

5. Alternatively, a combination of supplying system identifier (e.g. DVB original network id, CA system id, DVB bouquet id), plus some identifier from the common system, plus a number uniquely generated by that device. Several alternatives are described below.

By allowing and managing various methods for improving and generating partial identifiers, a very flexible content identification scheme can be applied, which uses a fixed length content identifier, an can be used to guarantee the uniqueness of all content protected and managed within the common system.

This method also enables a persistent identification of the source of each content item throughout its life in the common system. A device or entity that is cognizant of all of the identifier allocation schemes can thus determine the origin of the acquired content.

The choice of which variant of content identification to apply in the common system is left for the discretion of the implementer/manufacturer of the device or entity that acquires, or ingests content into the common system.

FIG. 1 shows the structure of the content instance identifier CIID in the common system, based on the example of adopting a 128-bit (16-byte) content identifier with a most significant byte MSB and a least significant byte LSB.

The generic common content identifier comprises three constituent parts:
Allocation type discriminator 1,
Pre-allocated part 2,
Freely allocatable part 3.

Allocation type discriminator 1 is a fixed-length field populated by one of the assigned values, for example the first 8 bits (1 byte). The scheme is expandable by reserving unused values of the prefix code for other external identification systems for which inclusion is facilitated by the allocation of a free prefix code to the new system to be accommodated. So some registration authority for the prefix codes is needed, and a specification of the format of the remaining data field in each case.

The scope of the pre-allocated part 2 and the freely allocatable part 3 size depend on the allocation scheme, indicated in byte 0. The pre-allocated part 2 always commences from byte 1, and occupies a certain fixed-length part of the remaining bytes of the content identifier field, depending on the allocation scheme indicated in byte 0. The rest of the identifier CIID is left to the freely allocatable range 3. The device or entity that sets the content identifier CIID for each item of acquired content must manage the freely allocatable part 3 so that no duplicate identifiers CIID occur for different items of content.

Figure 2:
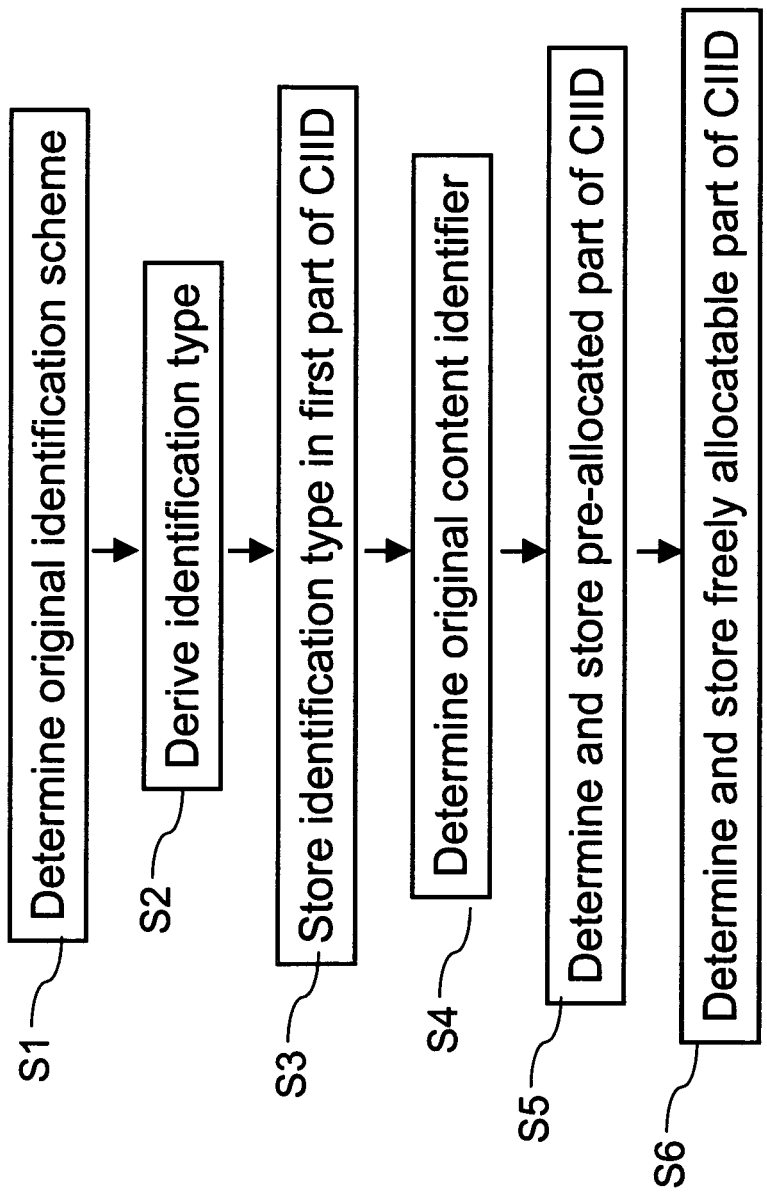
FIG. 2 shows steps of determining a unique content instance identifier.

In FIG. 2 the method steps for determining a unique content instance identifier (CIID) are depicted. In a first step S1 the original identification scheme is determined, in a second step S2 from this determined original identification an identification type is derived, which is stored in a third step S3 in a first part of the content instance identifier CIID. In a forth step S4 an original content identifier used by the content provider or the external system, from which the content item has been received is determined and used to determine and store a pre-allocated part of the content instance identifier CIID in a fifth step S5. In a sixth step S6 the freely allocatable part of the content instance identifier CIID is determined to ensure that each copy of the content item, which is handled within the content management and protection system, is identified uniquely.

FIG. 3 shows a possible list of contributing content identification schemes, just as an example. Each example is described in detail below. In the first column the scheme code is depicted which might be used (the scheme codes are just an example, other scheme codes might be applied as well) as the first part (allocation type discriminator) of the content instance identifier CIID. In the second column there is a verbal description of the original identification scheme used by the original external system, the third column shows a proposal for the length of the pre-allocated part in byte and the forth column shows a proposal for the length of the freely allocatable part in byte. The first row with the exemplary scheme code 00x0 might be used for internal purposes, might be forbidden or could be defined to mean the rest of the 31 bytes are freely allocatable by the device, without any guarantee of uniqueness within the whole system, so when the device will only have access to content that it acquires.

With these examples it is assumed that the common content management and protection system mandates an 8-byte (64-bit) unique device identifier for each device compliant with that system. One such device identifier scheme is the EUI-64, which consists of 3-byte company identifier (for which registrations are managed by the IEEE Registration Authority) and a 5-byte extension, commonly used to give a unique identifier for each device.

The original delivery-system-specific content identifier might remain embedded in the content, but it is not necessarily accessible to devices or entities in the common content management and protection system. The system (e.g. DVB-CPCM) adds its content license, including the common content identifier into the content in addition. The system (e.g. DVB-CPCM) either embeds that information and/or maintains a separate secure content license for that content.

Figure 4:
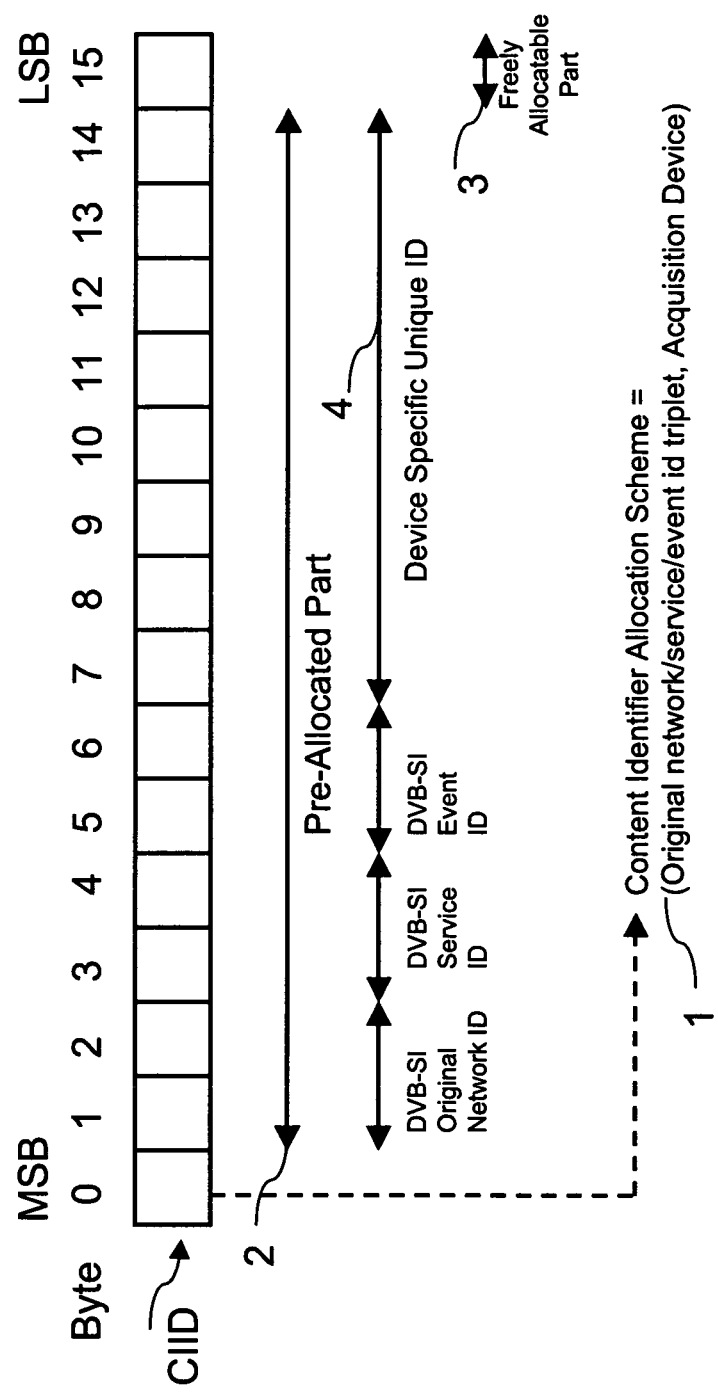
FIG. 4 shows a structure of a content item identifier for DVB Broadcast Content at Event Level.

FIG. 4 shows the structure of the content instance identifier CIID in a DVB-SI (DVB-Service Information) system. In DVB broadcast systems, although the audiovisual content arrives as a continuous stream of service events, each event is characterized by the combination of the DVB-SI data fields original network id+service id+event id, each with 2 bytes. In order to distinguish a recorded instance of that content from an instance recorded by a different consumer device, the unique identifier 4 of the device (8 bytes) that first acquired that content is appended to this data triplet, so that 14 bytes are building the pre-allocated part 2 and 1 byte is left for the freely allocatable part.

Figure 5:
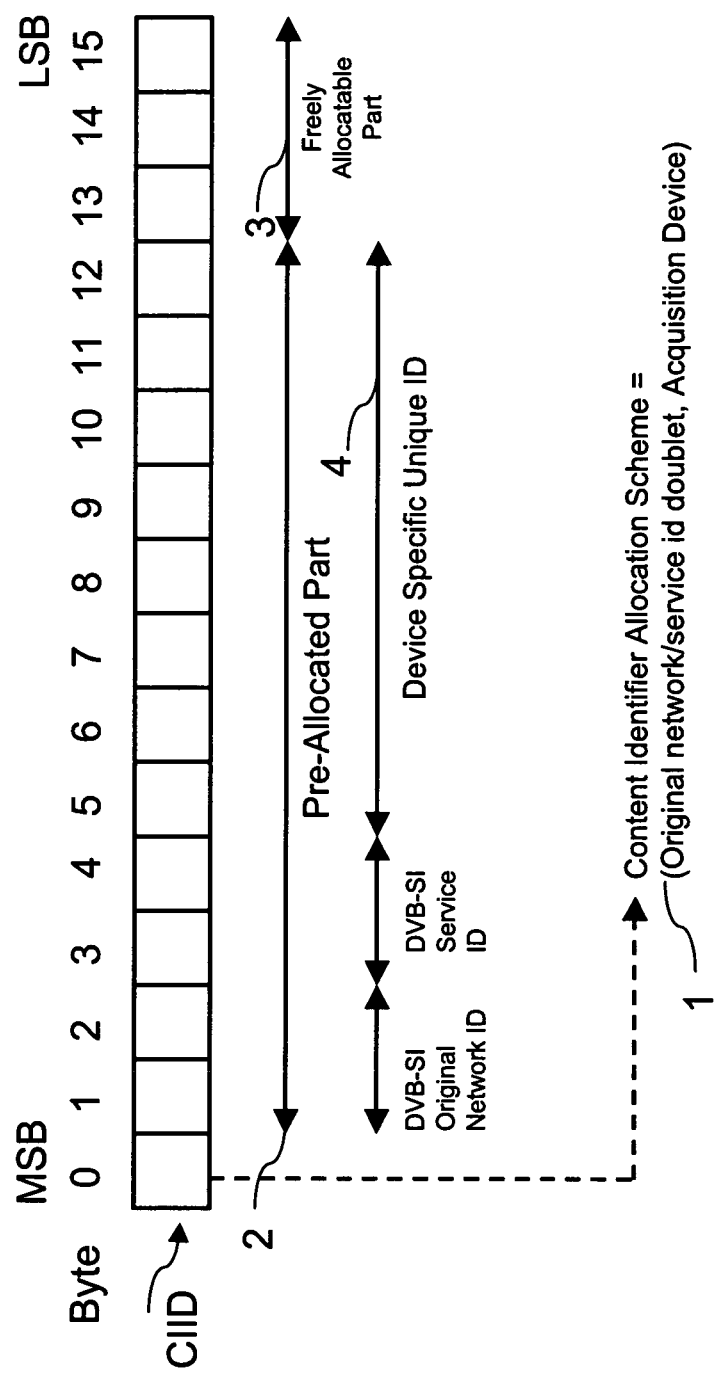
FIG. 5 shows a structure of a content item identifier for DVB Broadcast Content at Service Level.

FIG. 5 shows a scheme, wherein the event identifier is not considered to be significant, hence the pre-allocated part 2 would consist of the DVB original network identifier and the service identifier (each with 2 bytes) and 8 bytes for the device identifier, with 3 bytes left for the freely allocatable part.

Similar schemes are foreseen for ATSC (Advanced Systems Television Committee) broadcast system content, both with and without event-level allocation of content identifiers.

Figure 6:
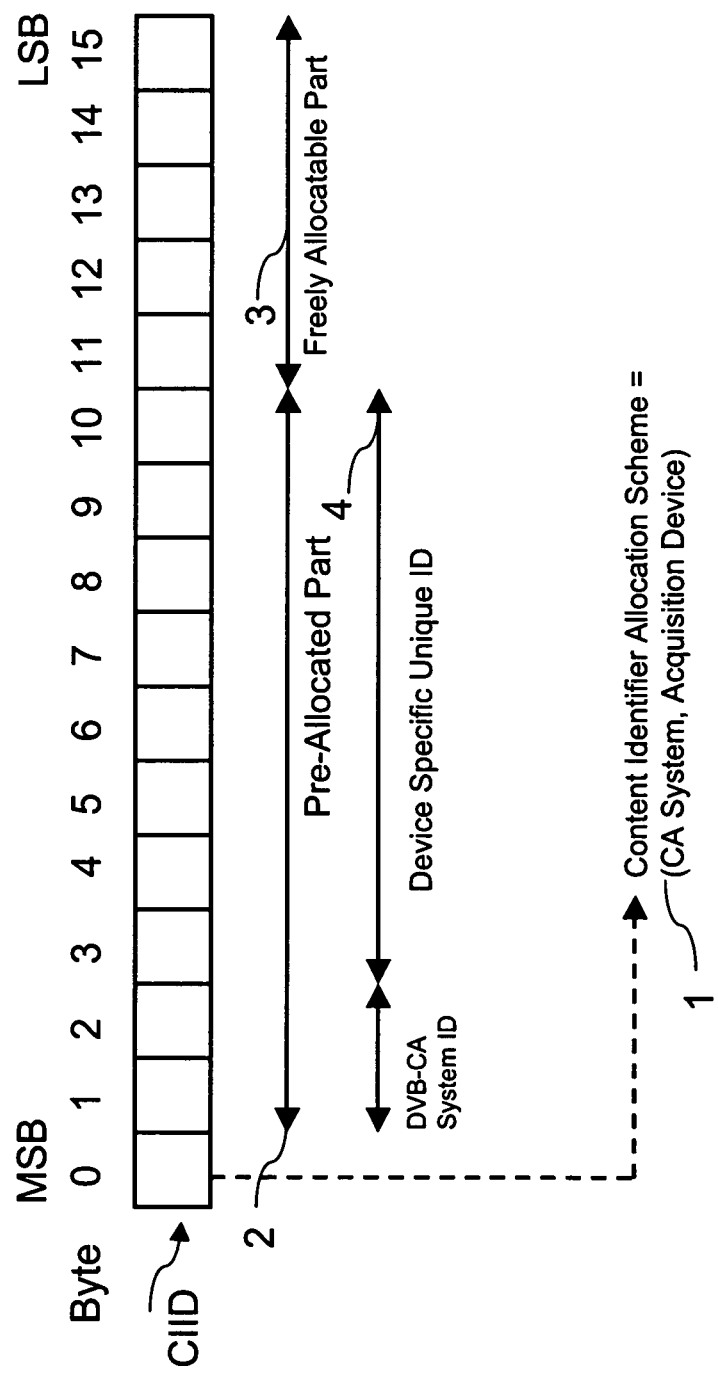
FIG. 6 shows a structure of the content item identifier for DVB CA System and Acquisition Device Identifier.

In FIG. 6 the scheme for a DVB CA System Identifier is depicted. This scheme is applied when the Conditional Access (CA) system used to deliver the content maintains its identification within the common management and protection system (2 bytes). Together with 8 bytes of device identifier 4 for the freely allocatable part 5 bytes remain.

Figure 7:
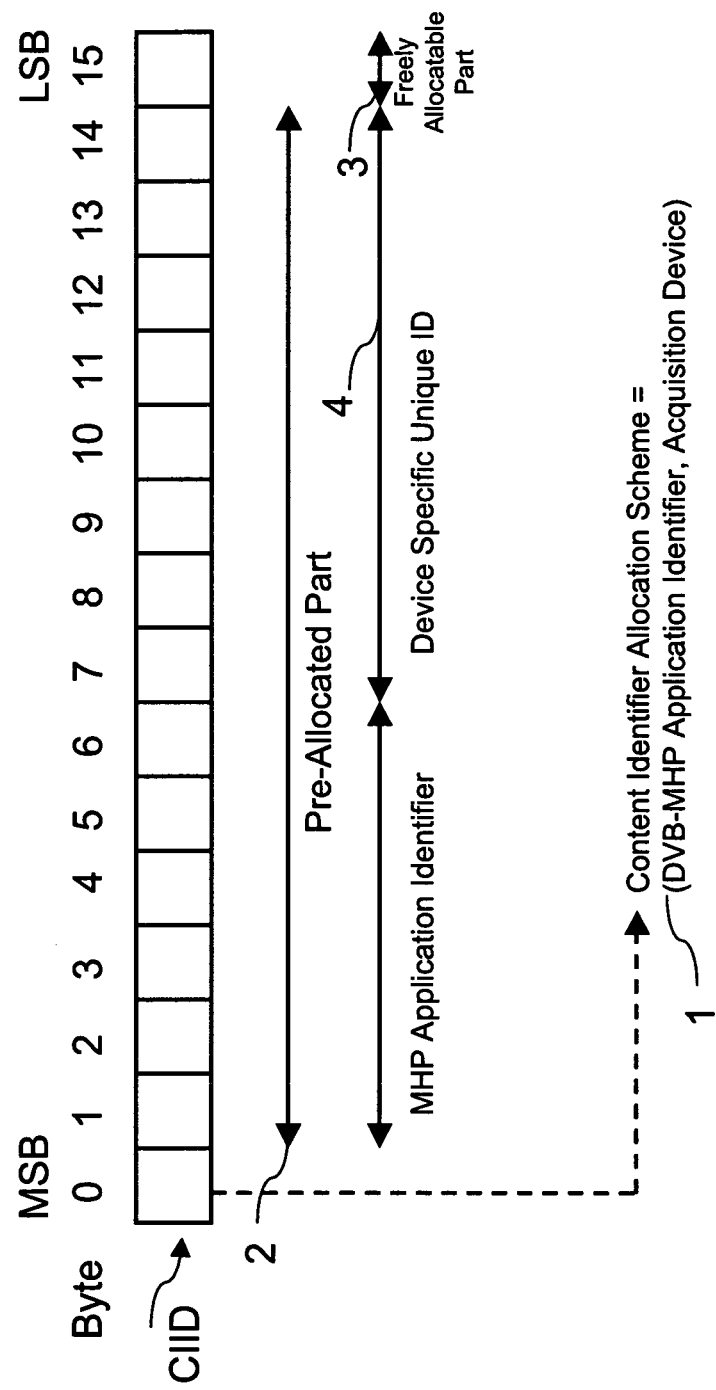
FIG. 7 shows a structure of the content item identifier for DVB-MHP Application and Acquisition Device Identifier.

In FIG. 7 the identification scheme for DVB-MHP (DVB-Multimedia Home Platform) is depicted. This scheme is applied when content is provided in association with a DVB-MHP software application that runs in the acquisition device. According to the DVB-MHP specification, the application is identified by its 6-byte (48-bit) application identifier, which consists of the 32-bit MHP Organisation Identifier and the 16-bit application identifier number. The unique device identifier (8 bytes) is appended in the pre-allocated part 2 so that 1 byte for the freely allocatable part 3 remains.

Figure 8:
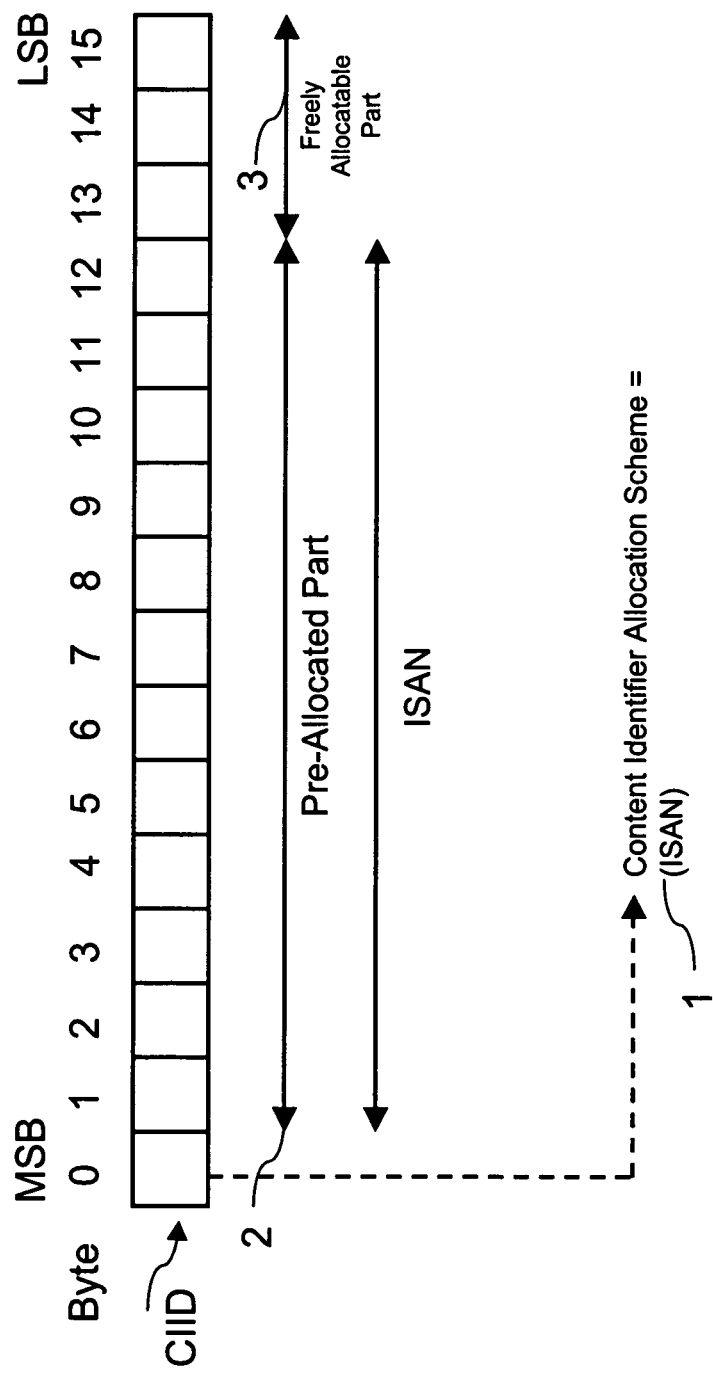
FIG. 8 shows a structure of a content item identifier for ISAN.

In FIG. 8 the identification scheme for using the International Standard Audiovisual Number (ISAN) is depicted. It uses 12-bytes ISAN code and 3 bytes freely allocatable. There would be no room to make this guaranteed universally unique using the device identifier 4 with a 16-byte identifier, however, as the ISAN refers to one particular produced item of content, it is likely that these 3 bytes will be enough with the envisaged distribution models of such content, i.e. this content would likely be bound to an individual consumer's domain of compliant devices in the common content management and protection system.

Figure 9:
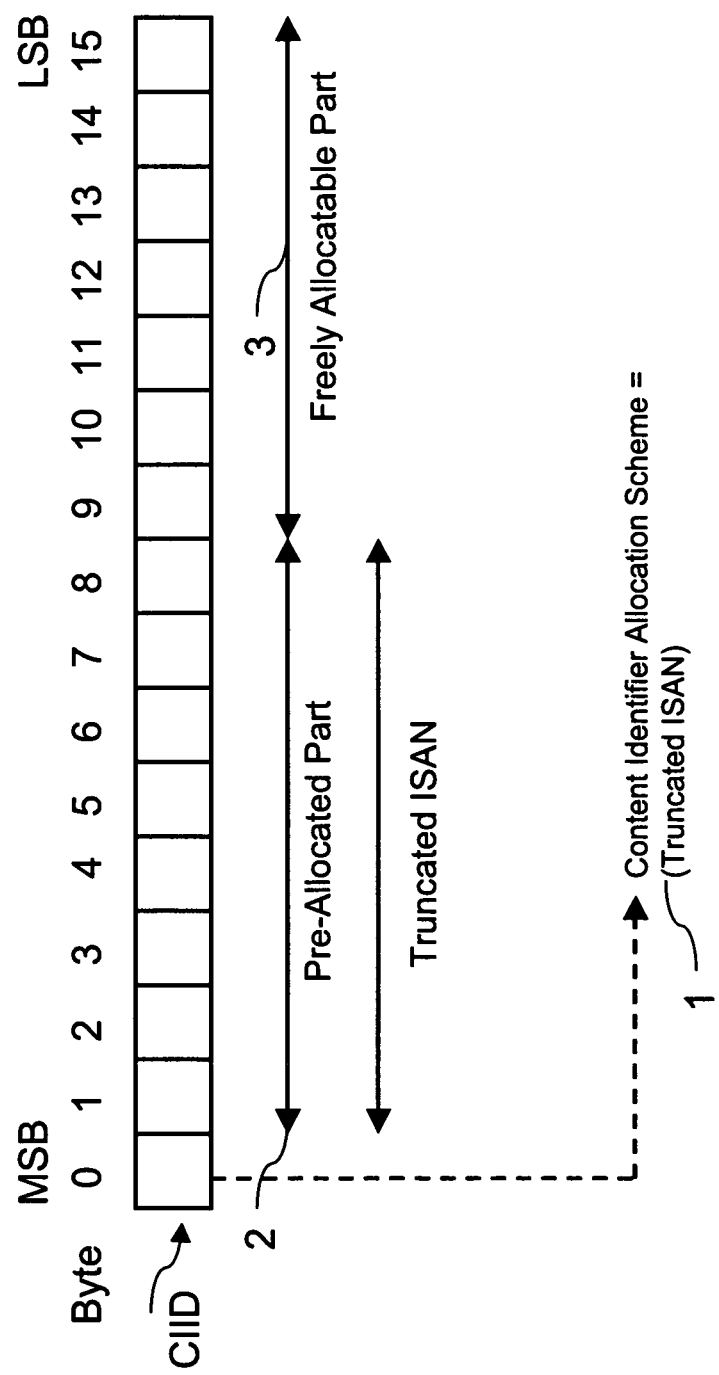
FIG. 9 shows a structure of a content item identifier for truncated ISAN.

FIG. 9 shows a variant with a truncated ISAN code, whereby the version number part (last 4 bytes) is not used in the pre-allocated part 2. This leaves 7 bytes for the freely allocatable part. This could then be set according to a unique DRM (digital rights management) license transaction used for the supply of that content to the acquisition device, hence maintaining the uniqueness of its identifier in the common system.

Figure 10:
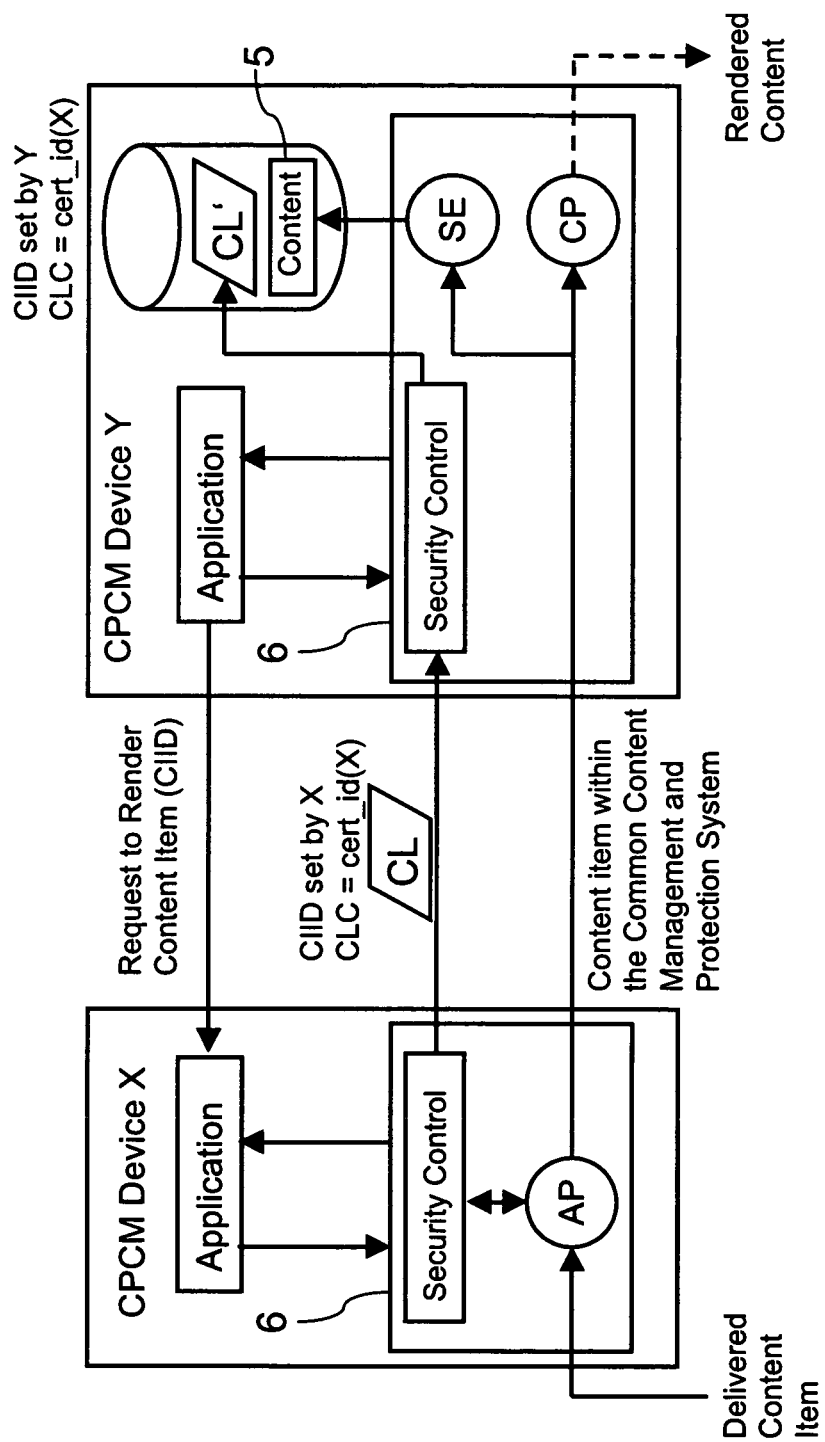
FIG. 10 shows schematically method steps to determine a new content license.

FIG. 10 shows schematically the content management in the Common Content Management and Protection System (e.g. DVB-CPCM). The content license CL is separate from the associated content item 5 (or at least logically separate whereby it could be embedded within the content item 5 at a known location, but encrypted with a different key than used for the content item 5 itself). The content license CL is generated on acquisition of the associated content item at an Acquisition Point AP by the acquisition or receiving device X. A system controller 6 with a security control determines the content license CL and within the content license CL there is stored a data for the content license creator CLC which is the device identifier of device X in this case (CLC=cert_id (X)). Also the content instance identifier CIID is set by the security control of the acquisition device X, e.g. according to the method described above. A further device Y within the content protection and management system (e.g. DVB-CPCM), which requests to render the content item with the content instance identifier CIID, stores the content item 5. The storing is realized by a storage entity SE. The rendered content item might be also consumed at a consumption point CP. When storing the content item 5 within the further device Y a copy of the content item is performed and a new CIID' is set by the further device Y and a corresponding new license CL' is built. The content license creator field CLC of the content license is the device identifier of the receiving device X, which firstly created the content license.

Figure 11:
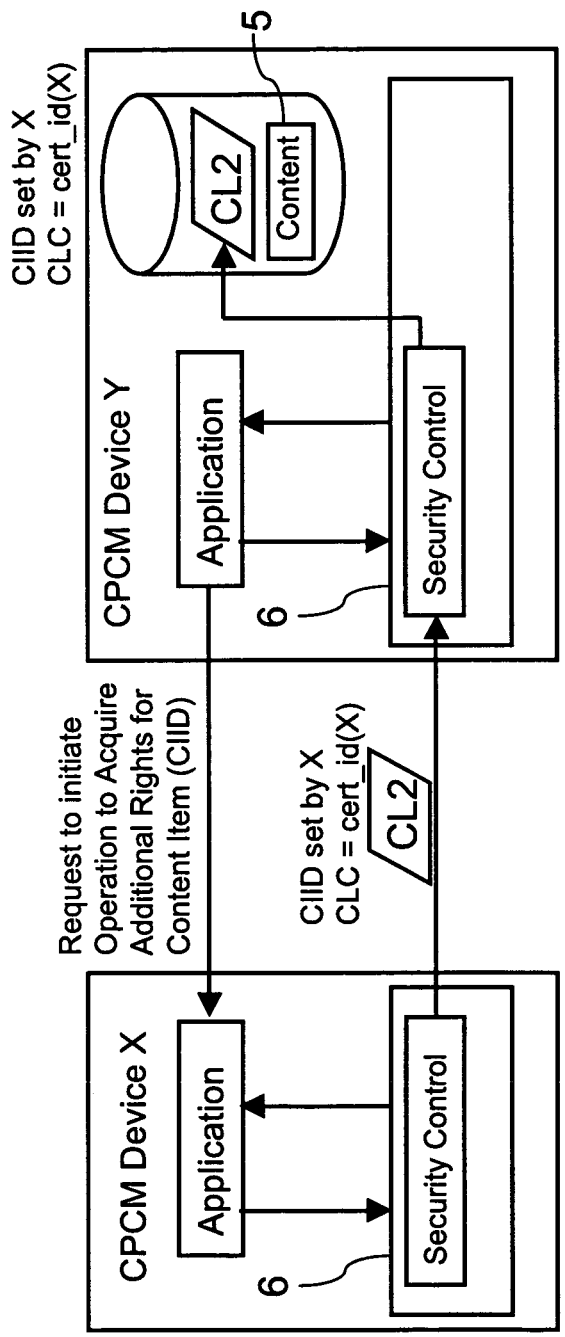
FIG. 11 shows schematically method steps to acquire new content licenses for additional usage rights.

Other possibilities might be:
Local storage:
CL stored securely in CL repository
Content stored in the device in encrypted form
Streaming over local network:
CL transferred separately to display device
Content streamed over local network
Receiving device in network creates a copy:
New CL created, with new content identifier (CIID)
Content and CL storage as for local "storage case" above
The "Content License Creator" field (CLC) for the Copy remains as that of the original acquisition device. This enables a link back to the entity that is authorized to supply a new CL for that content, in case subsequent CL updates are needed as it is depicted in FIG. 11 schematically. The content instance identifier CIID is set e.g. by the DVB-CPCM Instance that creates the content license CL for the associated content item.

If a user wants to interact with the content provider of a content item 5 in order to get additional usage rights (e.g. further copies, additional geographical range for usage) it is possible to identify the device, which originally creates the content license CL by the content license creator CLC field. This device (in FIG. 11 it is the first device X) is normally the device which has contact to the content provider and can contact the content provider and get an additional content license CL2, which can be forwarded to the second device Y. Therefore the second device Y provides a facility, for example by providing a corresponding defined communications message, to allow the further device Y to initiate a process of acquiring additional rights, via a new content license CL, for that content instance, by sending that message to the receiving device X identified as the content license creator CLC for that content instance.

With respect to the wording of first part 1, second part 2 and third part 3 it should be made clear that this wording does not imply necessarily an order, in which said first, second and third part are stored within said content instance identifier CIID.

The invention claimed is:

1. A method for determining a unique content instance identifier (CIID) of a content item, wherein said content item has been received by a receiving device and provided to a content management system and includes an original content identifier of an original identification scheme, the method comprising:
defining, by circuitry, a data structure of said unique content item identifier (CIID) depending on said original identification scheme, said data structure comprising a first, a second, and a third part, wherein a size of at least one of said second and third parts depends on the original identification scheme;
storing, to memory, a code in said first part, wherein said code uniquely identifies said original identification scheme;
storing, to said memory, said original content identifier, a derivative thereof, and/or a device identifier, identifying said receiving device in said second part; and
storing, to said memory, a freely allocatable value in said third part, such that no duplicate unique content instance identifiers (CIID) are generated by said device.

2. A method for determining a unique content instance identifier (CIID) according to claim 1, wherein an original content identifier, determined by an original content provider or an original content delivery system, is stored at least as a part of said second part.

3. A method for determining a unique content instance identifier (CIID) according to claim 1, wherein
said device identifier is determined for the receiving device and said device identifier is stored at least as a part of said second part.

4. A method for determining a unique content instance identifier (CIID) according to claim 1, wherein
in a case said original identification scheme is a digital video broadcast event specific identification, a combination of the DVB-SI fields original_network_id, service_id and event_id is stored at least as part of said second part.

5. A method for determining a unique content instance identifier (CIID) according to claim 1, wherein
in a case said original identification scheme is a digital video broadcast service specific identification, a combination of the DVB-SI fields original_network_id and service_id is stored at least as part of said second part.

6. A method for determining a unique content instance identifier 15 (CIID) according to claim 1, wherein
in a case said original identification scheme is a conditional access (CA) specific identification, a DVB-CA system identifier is stored as part of said second part.

7. A method for determining a unique content instance identifier (CIID) according to claim 1, wherein in case said identification scheme is a DVB-MHP specific identification, a DVB-MHP Application identifier is stored at least as part of said second part.

8. A method for determining a unique content instance identifier (CIID) according to claim 1, wherein in a case said original identification scheme is an International Standard Audiovisual Number (ISAN) scheme, an ISAN is stored at least as part of said second part.

9. A method for determining a unique content instance identifier (CIID) according to claim 1, wherein
in a case said original identification scheme is a truncated ISAN identification, a truncated ISAN is stored at least as part of said second part.

10. A method for determining a unique content instance identifier (CIID) according to claim 1, wherein
only the device identifier is stored as said second part.

11. A method for determining a unique content instance identifier (CIID) according to claim 1, wherein
the size of said unique content instance identifier (CIID) is 16 byte.

12. A method for determining a unique content instance identifier (CIID) according to claim 1, wherein
the size of said first part is one byte.

13. A method according to claim 1, wherein said content management system is adapted to be a content management and protection system, and
a content license (CL) is created by a device, comprised within said system, for said content item to manage usage of said content item within said system, and
a device identifier of the device which has created the first content license (CL) for said content item is stored as a Content License Creator (CLC) field in the content license (CL), such that this value is not changed by any compliant device within said content management and protections system.

14. A method according to claim 13, wherein
a device which copies a content item within said system determines a new content instance identifier (CIID'), applying a same allocation scheme as determined by said first part of the original content instance identifier (CIID), thus setting at least one of the second or third part of the new content instance identifier (CIID') to new values, for the copy of said content item, and determines a new content license (CL'), but does not change the content license creator (CLC) field set by the device, which has created the first content license (CL).

15. A method according to claim 13, wherein
if additional usage rights for a content item are requested by a user, the system allows the device to initiate a process of acquiring new rights, via a new content license for said content instance, by sending a message to said device, which has created the first content license (CL), identified as the content license creator (CLC) for that content instance, and said device initiates a communication with the content provider about said new rights.

16. A device for determining a unique content instance identifier (CIID) of a content item, wherein said content item has been received by a receiving device and provided to a content management system and comprises an original content identifier of an original identification scheme, comprising:
a system controller including circuitry configured to:
apply a data structure of said unique content item identifier (CIID) depending on said original identification scheme, said data structure comprising a first, a second, and a third part, wherein a size of at least one of said second and third parts depends on the original identification scheme;
store a code in said first part, wherein said code uniquely identifies said original identification scheme;
store said original content identifier, a derivative thereof, and/or a device identifier, identifying said receiving device in said second part;
store a freely allocatable value in said third part, such that no duplicate unique content instance identifiers (CIID) are generated by said device.

17. A device for determining a unique content instance identifier (CIID) according to claim 16, wherein
said circuitry is further configured to store said original content identifier, determined by an original content provider or an original content delivery system, at least as a part of said second part.

18. A device for determining a unique content instance identifier (CIID) according to claim 16, wherein
said circuitry is further configured to determine a device identifier of said receiving device and to store said device identifier at least as a part of said second part.

19. A non-transitory computer-readable medium that stores a unique content instance identifier (CIID) of a content item, wherein said content item has been received by a receiving device and provided to a content management system and comprises an original content identifier of an original identification scheme, comprising:
a data structure depending on said original identification scheme, said data structure comprising a first, a second, and a third part, wherein a size of at least one of said second and third parts depends on the original identification scheme;
said first part comprising a code, wherein said code uniquely identifies said original identification scheme;
said second part comprising said original content identifier, a derivative thereof, and/or a device identifier, identifying said receiving device in said second part; and
said third part comprising a freely allocatable value such that no duplicate unique content instance identifiers (CIID) exist.

20. A non-transitory computer-readable medium according to claim 19, wherein
said original content identifier, determined by an original content provider or an original content delivery system, is at least a part of said second part.

21. A non-transitory computer-readable medium according to claim 19, wherein
a device identifier of the receiving device is at least a part of said second part.

22. A method for managing content licenses (CL) in a content management and protection system, wherein content items are handled, comprising:
creating by a device, comprised within said system, a content license (CL) for a content item to manage the usage of said content item within said system; and
storing a device identifier of the device which has created the first content license (CL) for said content item as a Content License Creator (CLC) field in the content license (CL), such that this value is not changed by any compliant device within said content management and protections system.

23. A device for managing content licenses (CL) in a content management and protection system, wherein content items are handled, comprising:
a system controller adapted to:
create a content license (CL) for a content item to manage the usage of said content item within said system, and
store a device identifier of said device, which has created the first content license for said content item, as a Content License Creator (CLC) field in the content license (CL), such that this value is not changed by any compliant device within said content management and protections system.

* * * * *